H. W. WILLIAMS.
DISPENSING MACHINE.
APPLICATION FILED MAR. 8, 1920.

1,375,947.

Patented Apr. 26, 1921.
6 SHEETS—SHEET 1.

H. W. WILLIAMS.
DISPENSING MACHINE.
APPLICATION FILED MAR. 8, 1920.

1,375,947.

Patented Apr. 26, 1921.
6 SHEETS—SHEET 2.

Inventor
H. W. Williams
By R. J. McCarty
His Attorney

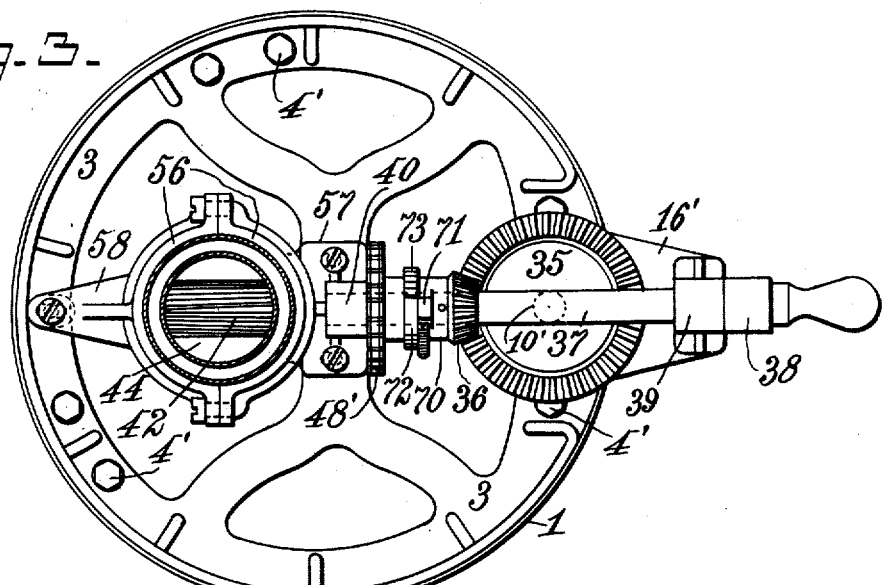
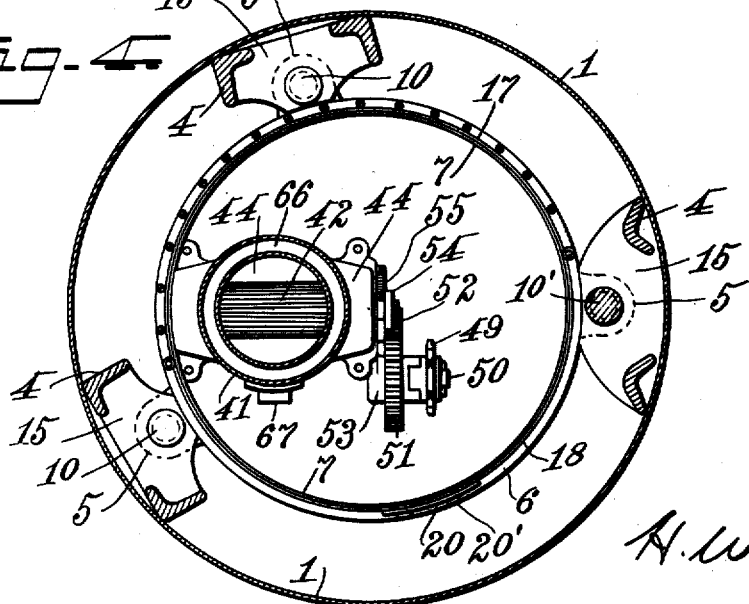

H. W. WILLIAMS.
DISPENSING MACHINE.
APPLICATION FILED MAR. 8, 1920.
1,375,947.
Patented Apr. 26, 1921.
6 SHEETS—SHEET 4.
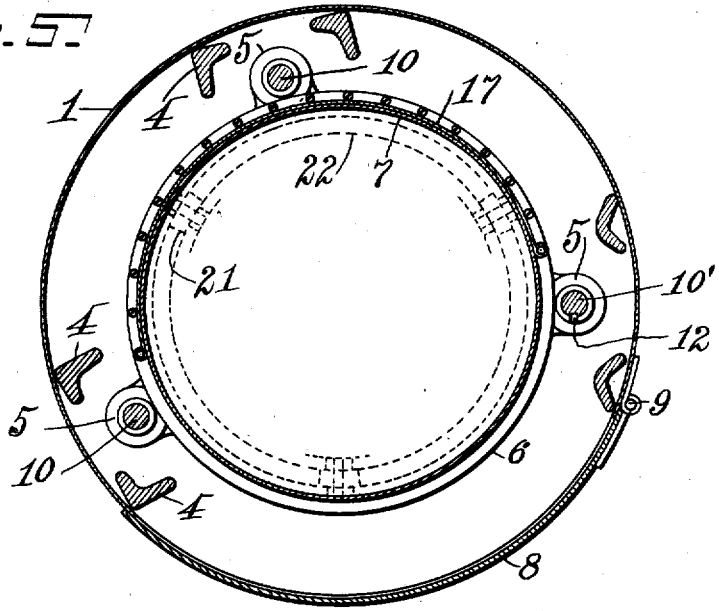
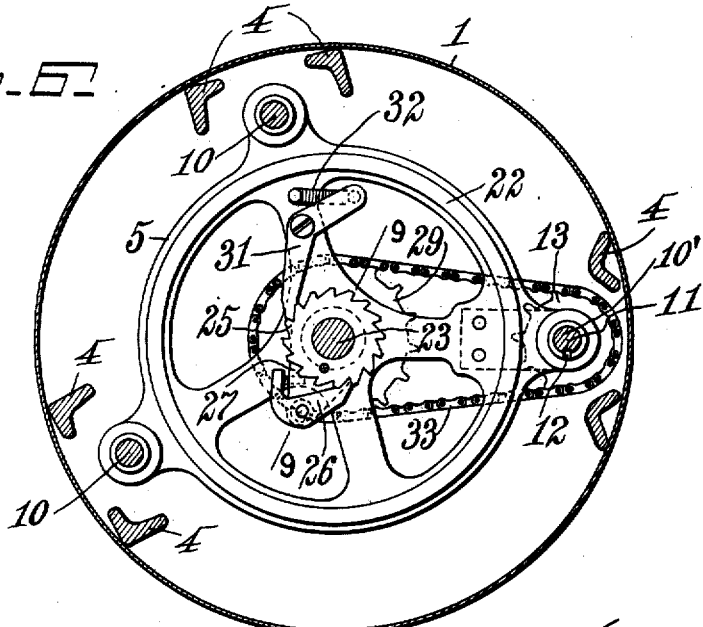
Inventor
H. W. Williams
By R. J. McCarty
his Attorney H. W. WILLIAMS.
DISPENSING MACHINE.
APPLICATION FILED MAR. 8, 1920.
1,375,947.
Patented Apr. 26, 1921.
6 SHEETS—SHEET 5.
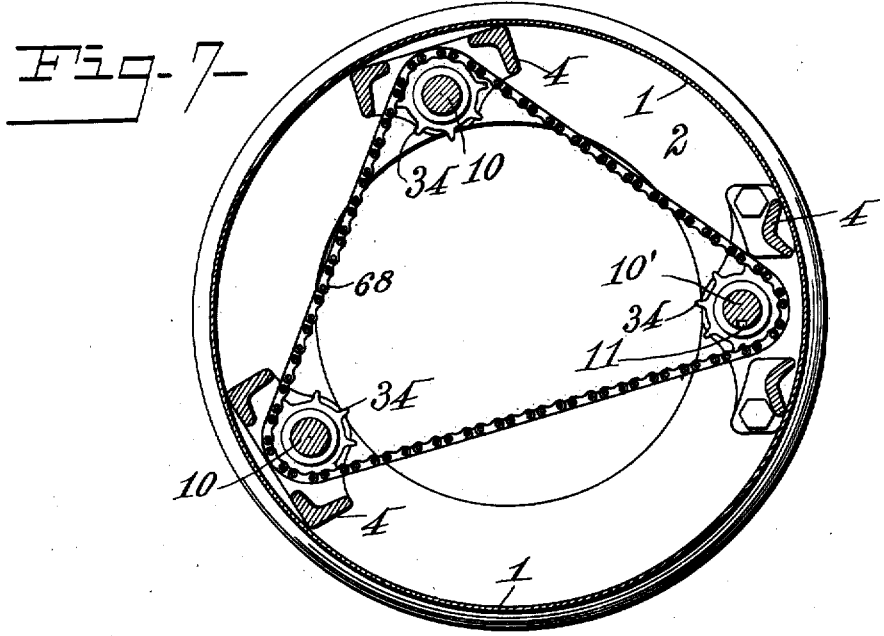
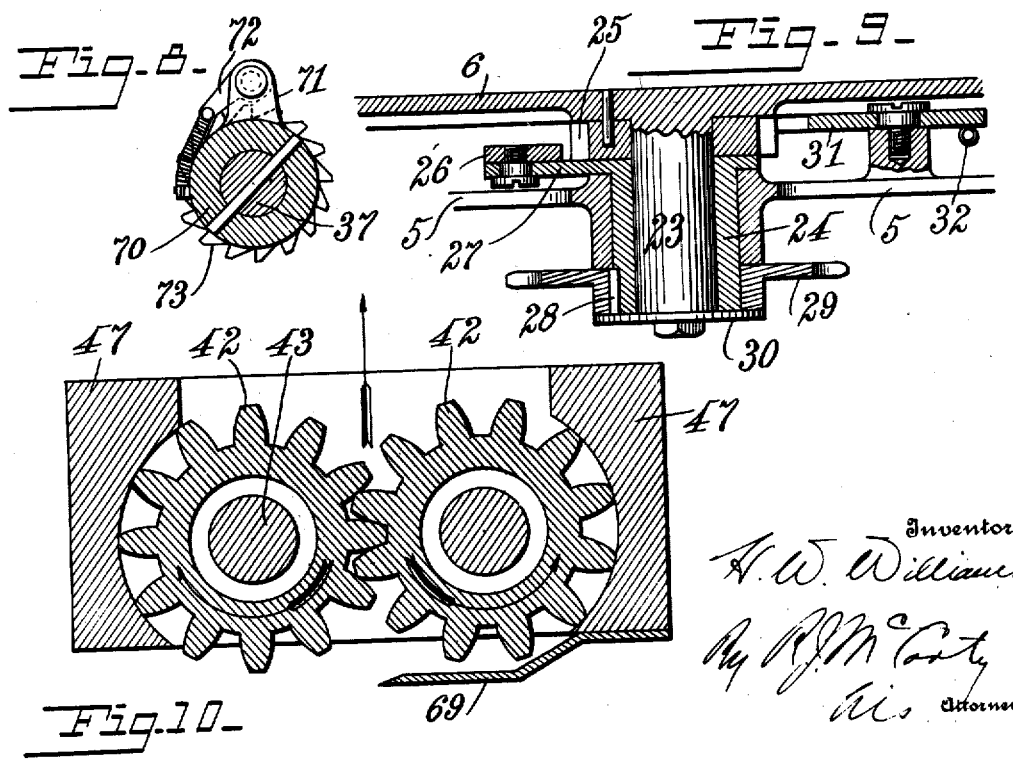

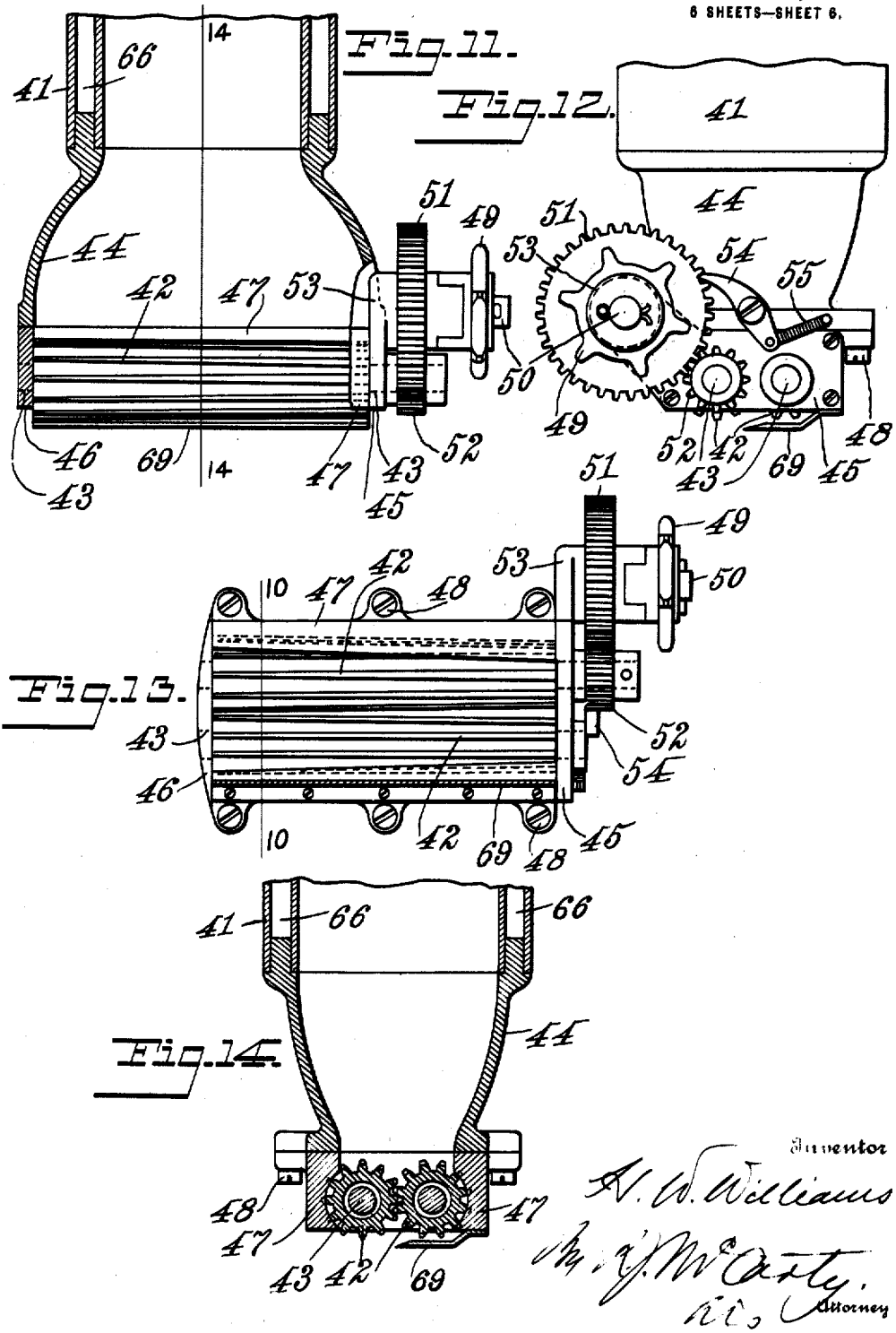

UNITED STATES PATENT OFFICE.

HARRY W. WILLIAMS, OF DAYTON, OHIO, ASSIGNOR TO THE SUPERIOR TOOL COMPANY, OF DAYTON, OHIO, A CORPORATION OF OHIO.

DISPENSING-MACHINE.

1,375,947.  Specification of Letters Patent.  Patented Apr. 26, 1921.

Application filed March 8, 1920. Serial No. 363,940.

*To all whom it may concern:*

Be it known that I, HARRY W. WILLIAMS, a citizen of the United States, residing at Dayton, in the county of Montgomery and State of Ohio, have invented certain new and useful Improvements in Dispensing-Machines, of which the following is a specification.

This invention relates to new and useful improvements in machines for dispensing plastic materials, such as lard, lubricating greases, ice-cream, etc.

The object of the invention is to provide an efficient machine of this character, which expeditiously and accurately discharges the commodities from the cans or packages in which they are packed, in any desired quantity, and which preserves the can or container from which the commodities are removed, free from damage in order that the same may be utilized for further use. Other objects and purposes are attained in the use of the mechanism hereinafter described in connection with the accompanying drawings, as will appear from the particular description in connection therewith.

Preceding a more particular description of the accompanying drawings reference in more general terms is made thereto.

Figure 1:
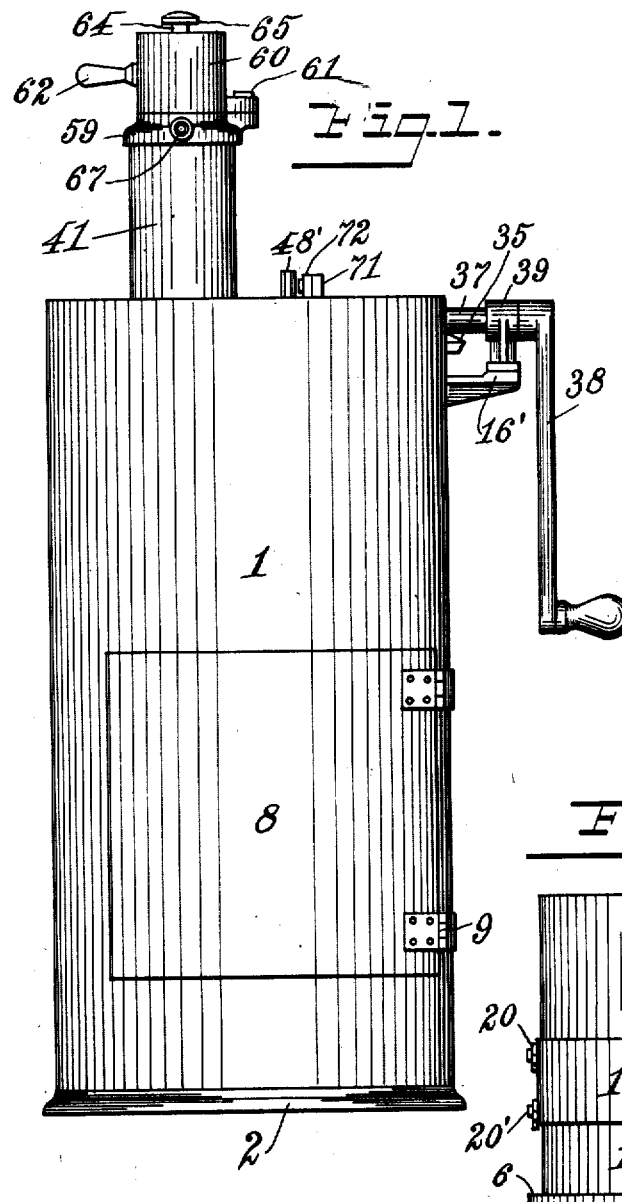
Figure 2:
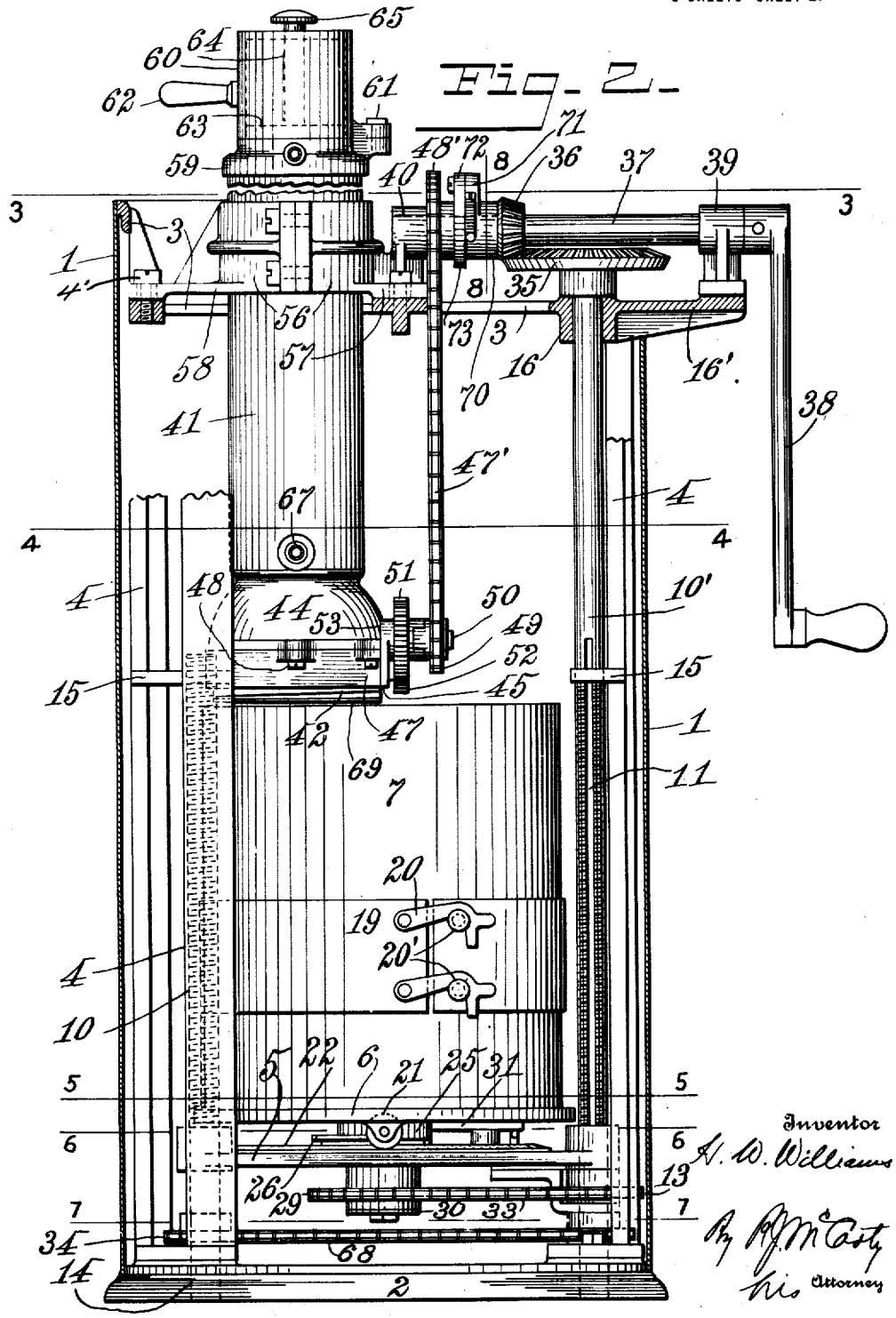

Figure 1 is an elevation of my improved dispensing machine. Fig. 2 is a larger sectional elevation, with the inclosing cylinder and the upper frame member appearing in section, and parts of the upright frame members broken off. Fig. 3 is a cross sectional view on the line —3—3— of Fig. 2. Fig. 4 is a cross sectional view on the line —4—4— of Fig. 2. Fig. 5 is a cross sectional view on the line —5—5— of Fig. 2. Fig. 6 is a cross sectional view on the line —6—6— of Fig. 2. Fig. 7 is a cross sectional view on the line —7—7— of Fig. 2. Fig. 8 is a sectional view on the line —8—8— of Fig. 2 showing the ratchet mechanism for driving the pump. Fig. 9 is a section on the line —9—9— of Fig. 6. Fig. 10 is an enlarged cross sectional view of the pump gears on the line —10—10— of Fig. 13. Fig. 11 is a sectional elevation of the bell end with part of the discharging tube, the pump members are also shown in elevation. Fig. 12 is an elevation at right angles to Fig. 11. Fig. 13 is a view of the pump members removed from the position shown in Figs. 11 and 12. Fig. 14 is a sectional view on the line —14—14— of Fig. 11, and Fig. 15 (Sheet 1) is an elevation of the can or container from which the commodity is removed, showing also the revolving platform upon which said can is supported and the clamp or holder for securing said can firmly on said platform.

In a more particular description of the invention, similar reference numerals indicate corresponding parts in the drawings and description.

In general terms the invention is exemplified in a machine in which the container or can holding the lard or other commodity to be dispensed, is placed, and is given rotary and elevating movements simultaneously during which the contents of said can or container are removed from the mouth thereof and passed upwardly into a delivery cup by means of a pump, said cup being of a character to indicate the quantity of the material delivered thereto as well as the cost or retail price thereof. The delivery cup is no part of the present invention, being substantially the same as that shown and described in Letters Patent granted to William R. Mittendorf, 1,068,153, July 22, 1913.

The machine as shown in Figs. 1 and 2 of the drawings, comprises an inclosing cylinder —1— which is secured to a base plate —2— and an upper frame member —3—. The said base plate —2— and upper frame member —3— are connected by upright members —4— which are tightened by bolts —4'— and extend vertically, and the parts so connected constitute the frame-work of the machine which provides suitable bearings and supports for the working parts thereof.

Mainly, these consist of a lifting platform —5—, and a revolving platform —6— which is supported upon platform —5—. The revolving platform —6— directly supports the can or container —7— from which the commodity is discharged. It will be assumed that in the present instance the said can or container —7— contains lard as it comes from the packer. The same is placed in position on platform —6— in the machine, by opening the door —8— of the casing or cylinder —1—, said door, as shown in Fig. 1 having hinges —9—. Each receptacle as emptied of its contents, is removed through said door and replaced by a new one.

The lifting platform —5— is raised and lowered by lifting screws of which there are three, two being designated by —10—. One of these screws, to wit, —10'—, is the main lifting screw and it has a spline —11— therein, in which a key —12— travels, said key projecting from the sprocket wheel —13— of the lifting platform —5—. The lower ends of the said lifting screws have bearings —14— in the base plate —2— and the upper portions of said screws are provided with steady bearings —15— on the upright frame members —4— which, as before stated, unite the base plate —2— and the upper frame member —3—. The main lifting screw —10'— extends upwardly and has a bearing —16— in an extended part —16'— of the said frame —3—.

Figure 15:
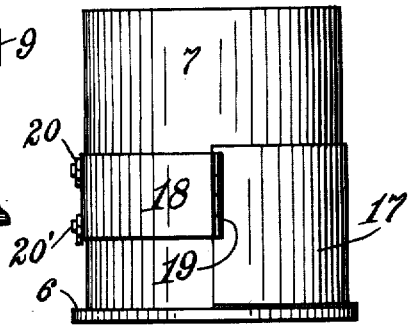

The container —1— is held upon the revolving platform —6— by being clamped against a semi-circular chuck —17— that stands upright on said platform —6—, and which is rigidly secured to said platform —6— or made a part thereof, as shown in Fig. 15. The inside or clamping surface of said chuck is slightly smaller than the average outside diameter of the can or container —7— and the clamping surface thereof may be corrugated and roughened in order to firmly hold the can or container in position when clamped. Straps or clamps —18— hinged at —19— to the chuck —17,— are adapted to be tightened around the front of the can to clamp the same firmly against said chuck —17— by means of eccentric hooks —20— which are pivoted to one of said straps and hook over pins —20'— on the other, as shown in Fig. 2. It will be understood that any suitable means may be employed for holding the can or container —7— firmly on the revolving platform —6—. The means above described are efficient and may be employed for this purpose.

The revolving platform —6— is provided with rollers —21— which travel on a track or circular raised portion —22— of the lifting platform —5—.

As shown in Figs. 6 and 9, a pivot —23— projects downwardly from said revolving platform —6— within a sleeve —24—. On the underside of said revolving platform —6—, a ratchet wheel —25— is secured. A pawl —26— engages said ratchet wheel to rotate the platform —6—, said pawl —26— being pivotedly supported on a projection or arm —27— which extends from the upper end of the sleeve —24—. The sleeve —24— is inclosed by the hub of the lifting platform —5— the circumference of which is provided with openings to receive the lifting screws before referred to. Attached to the sleeve —24— is a sprocket wheel —29— the hub of which is inclosed by a retaining plate —30— which is secured to the sleeve —24— by a key —28—. The pawl —26— functions in connection with the ratchet wheel —25— when the can or container —7— is being elevated, to revolve said can in the meantime, but, the said pawl —26— rides over the teeth of said ratchet wheel when the can or container is being lowered. During this period the ratchet wheel —25— remains stationary through the control of a holding pawl —31— pivoted to a part of the lifting platform —5— and held in engagement with said ratchet by a spring —32—. The sprocket wheel —29— is driven by a chain —33— from the sprocket wheel —13—, said sprocket wheel being heretofore referred to, and the same being driven by the main lifting screw —10'—. The upper end of the said screw, which as before stated, has a bearing —16— in the upper frame member —3—, has a bevel gear —35— fixed to it which meshes with a bevel pinion —36— on the main driving shaft —37—. The shaft is operated manually from a crank handle —38—. The said main driving shaft —37— is provided with bearings —39— and —40— on the upper frame member —3—, and from the foregoing description it will be seen that by rotating the shaft —37—, the can or container —7— will be elevated by the lifting platform —5— through means of the lifting screws —10—10'— and revolved by platform —6— rotated through the means shown in Fig. 9 of the drawings.

Lifting screw —10'— has been referred to as the main lifting screw merely because it receives the power from shaft —37— and is made longer than the other two. The power is transmitted to the two other screws from a sprocket wheel —34— fixed to the lower end of said screw —10'—, and similar sprocket wheels —34— fixed on screws —10—, all of which wheels are connected by a sprocket chain —68—.

During the simultaneous rotation and elevation of the can or container the lard or other commodity therein contained is removed from the mouth of the can by means which engages the lard and elevates it into a discharging tube —41—. The means by which the lard is thus elevated or removed from the can may properly be termed a pump, and is illustrated in detail on Sheet 6 of the drawings.

It consists of two elongated toothed members —42— which are mounted upon shafts —43— having bearings in the end plates —45— and —46— attached to side plates —47—, which parts, together with the said toothed members —42— may be said to constitute the pump. The united parts —45—46—47— are attached by bolts —48— to the bell end —44— of the discharge tube —41—. The ends only of said toothed members —42— are secured to their respective shafts, other portions of said gears being chambered out around the shafts as shown in Fig. 10, to decrease weight. The lower end of the discharge tube —41— is supported upon the bell end —44—, which is in the form of a casting as are also the parts which house the toothed members —42—. Projecting from one of the side plates —47— is a scraper or blade —69— which is made rigid thereto and scrapes the lard into the space between the adjacent teeth of the members —42— as the can or container is rotated and elevated. From Fig. 2 it appears that the elongated toothed members —42—, which constitute the pump as before stated, are of a length which extends approximately from the center of the can to the inner circumference thereof, so that when the can is rotated the entire contents thereof is engaged by the rotating toothed members. Owing to the increasing radius of the body of the lard or other commodity within said receptacle from the center to the circumference thereof, if provision were not made the pump or toothed members —42— would discharge the lard unequally, therefore, the said members are tapered outwardly from their inner ends by the said teeth being cut down to the pitch line at the center and gradually given their full length at their outer ends. The said elongated toothed members —42— are driven from the main driving shaft —37— through means of a sprocket chain —47'— which connects with a sprocket wheel —48'— loose on said shaft —37—.

The bevel pinion —36— is integral with a sleeve —70— which is pinned to the shaft —37— (Fig. 8) and from said sleeve an arm —71— projects and supports a ratchet pawl —72—. Loose on the shaft —37— is a ratchet wheel —73— that is engaged by said pawl and joined to said ratchet wheel is the upper sprocket wheel —48— connected by the chain —47'— to a lower sprocket wheel —49— on a short shaft —50—. The transmission gear —51—, on the same axis with sprocket wheel —49— meshes with a pinion —52— on a projected end of one of the shafts of the elongated toothed members —42—, as shown in Fig. 13. The shaft of the gear —51— is supported on an extended part —53— of the end plate —45— at the bell end —44— of the discharge tube.

It will be understood that in the elevation of the container —7— the contents thereof is removed by the pump as the same is elevated and that the operation may be continuous or intermittent. After the contents have been completely removed by the complete elevation of the container the lifting and revolving platforms —5—6— and the container are lowered by a reverse movement of the main driving shaft —37—. During this movement it is desirable that the pump members —42— remain stationary, and the revolving platform —6— shall remain stationary as to rotation. This is accomplished in reference to the platform —6— through means of the holding pawl —31— as shown in Fig. 6 and before referred to. The pump members —42— are prevented from rotating by means of a similar holding pawl —54— (Fig. 12), which is pivoted at the bell end —44— of the discharge tube and engages the teeth of the gear —51—. This pawl is held in such engagement by a spring —55— as is also the pawl —31— by a spring of similar character. The reverse operation of the main driving shaft therefore, has no effect on the pump member, and the revolving platform other than to lower the latter.

The discharge tube including the bell end thereof is firmly supported in the position shown in Fig. 2 by a clamp consisting of two parts —56— which embrace the upper portion of the tube at the upper frame member —3—. The said parts —56— are united by bolts as shown in Fig. 3, and have extensions —57— and —58— which are bolted to the upper frame member —3— and thereby made firm. The upper end of said discharge tube is fitted with a ring or open casting —59— above which is placed a delivery cup —60—, said cup being hinged at —61— to the said casting —59—. The said cup occupies an inverted position and has a handle portion —62— by which it is moved on the hinge —61— to discharge the contents thereof after the desired quantity of lard or other commodity has been discharged therein through the discharge tube —41—. On the interior of the said cup there is a plate —63— of equal diameter with the interior of the cup. This plate is shown in the lower position in dotted lines in Fig. 2 which indicates that the cup is empty. A plunger —64—, also shown partly in dotted lines in Fig. 2 is secured to the center of the plate —63— and extends outwardly through an opening in the top of the cup, the extended end being provided with a head —65— that may be pressed by the hand in discharging the contents of the cup into a suitable receptacle such as may be desired to place the amount of measured material in. The said measuring cup is such as that shown and described in the former patent hereinbefore referred to, and it is thought unnecessary to give any further description thereof. As the cup is shown in Fig. 2 it is immediately above the discharge end of the tube —41—, and when the machine is operated by turning the crank handle —38— the lard or other commodity is forced up through the tube —41— and into the cup —60—. As the contents enter the cup it forces the plate —63— upwardly and therewith the plunger —64— until the requisite amount of the material is delivered to said cup. When this is done the cup is swung to one side by the handle —62— and the commodity received by the cup is discharged therefrom by pressing downwardly on the plunger —65—. The tube —41— is provided with a surrounding cooling space or jacket —66— with openings —67— at the upper and lower ends thereof for an air or water pipe to communicate therewith.

While I have with some minuteness described the various structural features, it is to be understood that these may vary more or less within the knowledge of the skilled mechanic, without departing from the underlying principles of the invention, which contemplate means, broadly speaking for simultaneously rotating and elevating a container of the character specified, and the employment of a pump for removing the contents of said container as it is elevated and rotated, said contents being delivered through a discharge tube in various quantities.

It is possible that some changes may also be made in the form of pump for removing the material from the container without materially departing from the principles involved in this particular feature of the invention. I have found, however, the gear pump herein shown and described to be well adapted for the removal of the contents of the container. By cutting down the addendum of the teeth from a full tooth on the left end of the gears to about the pitch line at the right end, one half of the volume of the material is removed during one revolution of the gears. The volume removed at each revolution and lifting of the container may be calculated so that the material may be fed to the gear pump in the ratio at which the pump will dispose of it.

The machine has been described in connection with a cylindrical form of container —7— in which lard is usually packed by the packing establishments. It is to be understood, however, that the machine is not limited to the handling of this form of container. Kegs in which lard is also packed may be put through the machine with like effect. In that case it would be necessary to change the position of the discharging tube —41— to accommodate the gear pump to the form of the keg. For example, the mounting of the said tube would necessarily have to be of a character that would permit of the pump being swung more or less outwardly from the perpendicular position shown in Fig. 2, to reach the outwardly rounded form of the keg.

In the case of cylindrical cans or containers of varying diameters, the discharge tube and gear pump may be adjusted laterally in a perpendicular position by means of the oblong openings in the clamp extensions —57— and —58—, as seen in Fig. 3.

Having described my invention, I claim:

1. In a machine of the character specified, a rotatable platform adapted to support a container from which material is discharged, and a gear pump engaging said material in the mouth of the container to remove the same as the container rotates with the platform.

2. In a machine of the character specified, a rotatable platform adapted to support a container from which material is discharged, and a pump comprising elongated gears arranged to engage the material to remove the same as the container rotates with the platform.

3. In a machine of the character specified, a rotatable platform adapted to support a container from which material is discharged, and a pump comprising elongated gears engaging said material to remove it as the container is rotated by said platform, the teeth of said gears being tapered longitudinally from approximately the pitch line at one end thereof to approximately a full tooth at the other end thereof.

4. In a machine of the character specified, a rotatable platform adapted to support a container from which material is discharged, a gear pump engaging the said material from the center of the container to the inner circumference thereof and means for simultaneously rotating said platform and therewith the container, and the gear members of said pump.

5. In a machine of the character specified, a rotatable platform adapted to support a container from which material is discharged, a discharge tube mounted above the container and a pump mounted on said discharge tube and comprising two elongated gears adapted to engage said material from approximately the center thereof to the inner circumference of the container, the teeth of said gears being tapered outwardly from the pitch line at the inner ends thereof.

6. In a machine of the character specified, a rotatable platform, an elevating platform upon which the rotatable platform is supported, and a gear pump adapted to remove the material from a container supported upon said rotatable platform as it is rotated and elevated by said platforms.

7. In a machine of the character specified, a rotatable platform adapted to support a container from which material is discharged, an elevating platform below said rotating platform, a discharge tube to receive said material, and a gear pump mounted between said discharge tube and the container for discharging the material into the discharge tube, said discharge tube and gear pump being adjustable relative to the container.

8. In a machine of the character specified, a rotatable platform adapted to support a container from which material is discharged, and a gear pump engaging said material from the center to the circumference thereof, the said rotatable platform and the pump having a relative vertical movement whereby the said material is progressively penetrated throughout its depth by the pump.

9. In a machine of the character specified, a rotatable platform adapted to support a container from which material is discharged, an elevating platform supporting said rotatable platform, lifting screws supporting said elevating platform, connections between one of said lifting screws and the rotatable platform for imparting rotary movement thereto, a pump engaging the surface of said material from the center to the circumference thereof, said pump comprising two elongated and longitudinally tapered gears, a discharge tube supporting said gears, and means for simultaneously actuating the elevating and rotatable platforms and actuating said pump.

10. In a machine of the character specified, a rotatable platform adapted to support a container from which material is discharged, an elevating platform supporting said rotatable platform, lifting screws engaging the elevating platform at its circumgaging the elevating platform at its circumference, connections between one of said lifting screws and the center of the rotatable platform whereby said platforms are simultaneously actuated, a gear pump comprising two elongated tapered gears engaging the material in said container, a discharge tube receiving the material from said pump, and a delivery cup receiving the material from said discharge tube.

11. In a machine of the character specified, a rotatable platform adapted to support a container, a pump engaging the material in said container from the center to the circumference thereof as the container is rotated, a discharge tube supporting said pump, the support of said discharge tube being adjustable horizontally, and means for simultaneously actuating the rotatable platform and the pump.

In testimony whereof I affix my signature.

HARRY W. WILLIAMS.